(12) United States Patent
Miglietti et al.

(10) Patent No.: US 9,321,115 B2
(45) Date of Patent: Apr. 26, 2016

(54) METHOD OF REPAIRING A TRANSITION DUCT SIDE SEAL

(71) Applicants: Warren Martin Miglietti, Jupiter, FL (US); Emmerson Denver Rene, Riviera Beach, FL (US); Richard Douglas Konney, Palm City, FL (US)

(72) Inventors: Warren Martin Miglietti, Jupiter, FL (US); Emmerson Denver Rene, Riviera Beach, FL (US); Richard Douglas Konney, Palm City, FL (US)

(73) Assignee: Alstom Technologies Ltd, Baden (CH)

( * ) Notice: Subject to any disclaimer, the term of this patent is extended or adjusted under 35 U.S.C. 154(b) by 103 days.

(21) Appl. No.: 14/173,217

(22) Filed: Feb. 5, 2014

(65) Prior Publication Data

US 2015/0217393 A1  Aug. 6, 2015

(51) Int. Cl.
| | |
|---|---|
| B23K 31/02 | (2006.01) |
| B23K 1/00 | (2006.01) |
| B23P 6/00 | (2006.01) |
| F01D 9/02 | (2006.01) |

(52) U.S. Cl.
CPC ........... B23K 1/0018 (2013.01); B23P 6/00 (2013.01); *B23K 2201/001* (2013.01); *B23P 6/002* (2013.01); *F01D 9/023* (2013.01); *F05D 2230/237* (2013.01); *F05D 2230/31* (2013.01); *F05D 2230/80* (2013.01)

(58) Field of Classification Search
None
See application file for complete search history.

(56) References Cited

U.S. PATENT DOCUMENTS

| | | | |
|---|---|---|---|
| 4,159,410 A * | 6/1979 | Cooper | 219/137.7 |
| 4,657,171 A * | 4/1987 | Robins | 228/119 |
| 6,200,689 B1 * | 3/2001 | Ferrigno et al. | 428/600 |
| 6,568,187 B1 * | 5/2003 | Jorgensen et al. | 60/752 |
| 6,619,915 B1 * | 9/2003 | Jorgensen | 415/138 |
| 6,619,935 B1 | 9/2003 | Kluth et al. | |
| 6,644,032 B1 * | 11/2003 | Jorgensen et al. | 60/752 |
| 6,662,567 B1 * | 12/2003 | Jorgensen | 60/796 |
| 6,675,584 B1 * | 1/2004 | Hollis et al. | 60/796 |
| 2002/0136631 A1 * | 9/2002 | Zearbaugh et al. | 415/116 |
| 2003/0106318 A1 * | 6/2003 | Leahy, Jr. | 60/722 |
| 2003/0136811 A1 * | 7/2003 | Philip | 228/119 |
| 2004/0031270 A1 * | 2/2004 | Sileo et al. | 60/796 |
| 2004/0031271 A1 * | 2/2004 | Jorgensen | 60/796 |
| 2004/0050913 A1 * | 3/2004 | Philip | 228/194 |
| 2004/0134066 A1 * | 7/2004 | Hawtin et al. | 29/889.2 |
| 2004/0218715 A1 * | 11/2004 | Jones | 378/57 |
| 2005/0015980 A1 * | 1/2005 | Kottilingam et al. | 29/888.011 |
| 2005/0181231 A1 * | 8/2005 | Gupta et al. | 428/668 |
| 2005/0211674 A1 * | 9/2005 | Holmes et al. | 216/108 |
| 2005/0274009 A1 * | 12/2005 | Powers | 29/889.1 |
| 2006/0228219 A1 * | 10/2006 | Finton et al. | 416/244 A |
| 2006/0228573 A1 * | 10/2006 | Finton et al. | 428/575 |

(Continued)

FOREIGN PATENT DOCUMENTS

| | | | |
|---|---|---|---|
| CN | 102554355 A | * | 7/2012 |
| CN | 102601571 A | * | 7/2012 |
| EP | 2466070 A2 | * | 6/2012 |

*Primary Examiner* — Kiley Stoner
(74) *Attorney, Agent, or Firm* — Shook, Hardy & Bacon L.L.P.

(57) ABSTRACT

The present invention discloses various methods for repairing a side seal region of a transition duct aft frame region. Embodiments of the present invention include application of a braze filler material to worn locations of seal teeth, brazing of a braze preform to the seal teeth or removal of a worn seal tooth and brazing of material compatible with the transition duct to form a replacement tooth of the side seal. The transition duct is brazed in a furnace in an incremental heated process which elevates the transition duct to a temperature where the braze filler material adheres to the side seal region while also providing a stress relief to the transition duct.

28 Claims, 9 Drawing Sheets

(56) References Cited

U.S. PATENT DOCUMENTS

| | | | |
|---|---|---|---|
| 2006/0248718 A1* | 11/2006 | Szela et al. | 29/889.1 |
| 2006/0248719 A1* | 11/2006 | Szela et al. | 29/889.7 |
| 2007/0044306 A1* | 3/2007 | Szela et al. | 29/889.1 |
| 2007/0240422 A1* | 10/2007 | Jorgensen et al. | 60/752 |
| 2007/0258808 A1* | 11/2007 | Ohri et al. | 415/139 |
| 2008/0069697 A1* | 3/2008 | Ivakitch | 416/174 |
| 2008/0087020 A1* | 4/2008 | Hsu et al. | 60/752 |
| 2008/0166233 A1* | 7/2008 | Johnson et al. | 415/230 |
| 2008/0292903 A1* | 11/2008 | Milleville et al. | 428/680 |
| 2009/0220343 A1* | 9/2009 | Dimascio et al. | 416/161 |
| 2010/0011576 A1* | 1/2010 | Sutcu et al. | 29/889.2 |
| 2010/0050434 A1* | 3/2010 | Long | 29/889.1 |
| 2010/0147925 A1* | 6/2010 | Hanlon et al. | 228/112.1 |
| 2010/0192587 A1* | 8/2010 | Hessler et al. | 60/752 |
| 2011/0061393 A1* | 3/2011 | Jorgensen | 60/752 |
| 2011/0088260 A1* | 4/2011 | Yoshioka et al. | 29/888 |
| 2011/0138625 A1* | 6/2011 | Chin et al. | 29/889.1 |
| 2012/0047734 A1* | 3/2012 | Miller et al. | 29/888.021 |
| 2012/0093634 A1* | 4/2012 | Liotta | 415/173.3 |
| 2012/0186254 A1* | 7/2012 | Ito et al. | 60/722 |
| 2012/0304664 A1* | 12/2012 | Cihlar et al. | 60/796 |
| 2012/0308843 A1* | 12/2012 | Ott et al. | 428/614 |
| 2013/0082446 A1* | 4/2013 | Pezzutti | 277/412 |
| 2013/0164138 A1* | 6/2013 | Willett et al. | 416/219 R |
| 2013/0269820 A1* | 10/2013 | DiCintio et al. | 138/177 |
| 2013/0269821 A1* | 10/2013 | DiCintio et al. | 138/177 |
| 2013/0272863 A1* | 10/2013 | DiCintio et al. | 415/202 |
| 2013/0302647 A1* | 11/2013 | Ozbaysal et al. | 428/680 |
| 2013/0318991 A1* | 12/2013 | DiCintio et al. | 60/774 |
| 2014/0023482 A1* | 1/2014 | Wada et al. | 415/110 |
| 2014/0064954 A1* | 3/2014 | Singh et al. | 415/209.2 |
| 2014/0086739 A1* | 3/2014 | Machnaim et al. | 415/220 |
| 2014/0260316 A1* | 9/2014 | Weaver et al. | 60/796 |
| 2014/0260318 A1* | 9/2014 | Willis et al. | 60/796 |
| 2014/0366996 A1* | 12/2014 | Goncharov et al. | 148/528 |
| 2015/0121895 A1* | 5/2015 | Suciu et al. | 60/796 |
| 2015/0125281 A1* | 5/2015 | Georgieva et al. | 415/200 |
| 2015/0125282 A1* | 5/2015 | Georgieva et al. | 415/200 |
| 2015/0125286 A1* | 5/2015 | Suciu et al. | 415/201 |

* cited by examiner

METHOD OF REPAIRING A TRANSITION DUCT SIDE SEAL

CROSS-REFERENCE TO RELATED APPLICATIONS

Not applicable.

TECHNICAL FIELD

The present invention relates generally to methods for repairing worn surfaces of gas turbine transition duct. More specifically, a series of repair processes are provided for braze repairing an aft frame portion of a transition duct.

BACKGROUND OF THE INVENTION

In an effort to reduce the amount of pollution emissions from gas-powered turbines, governmental agencies have enacted numerous regulations requiring reductions in the amount of oxides of nitrogen (NOx) and carbon monoxide (CO). In response to these increasingly stringent emissions requirements, engine manufacturers have developed improved combustion systems. Lower combustion emissions can often be attributed to a more efficient combustion process, with specific regard to fuel injector location, airflow rates, and mixing effectiveness.

One type of improved combustion system for reducing emissions is a can-annular low NOx combustor. That is, the combustion system comprises a plurality of individual combustors arranged generally about a centerline of the gas turbine engine. Accordingly, each combustor receives a portion of the compressed air from the engine compressor, adds fuel from a fuel source, mixes the fuel and air together and ignites the mixture to produce hot combustion gases. These hot combustion gases then must pass from the individual combustors to the turbine inlet. Due to the geometry and orientation of the individual combustors, a plurality of individual ducts, also known as transition ducts, connect an outlet region of the combustor to the inlet region of the turbine. As such, the transition ducts also change geometry, generally from a cylindrical shape at its inlet (the combustor exit) to a semi-rectangular frame-like shape at its outlet (the turbine inlet). For reference to a transition duct exhibiting this geometry, see FIG. 1. As such, a plurality of transition ducts arranged about the gas turbine engine will result in their outlets each supplying a sector of the turbine inlet with the hot combustion gases from the individual combustors.

The transition ducts are typically located within a compressor discharge plenum, which is the region immediately downstream of the compressor of the engine. Compressed air is discharged into this plenum where it is then directed into the plurality of individual combustors. By locating the transition ducts in this plenum of air, the compressed air can also be used to cool the transition ducts prior to that air entering one or more of the individual combustors.

The transition ducts direct hot combustion gases to the turbine. However, the transition duct-to-turbine inlet region may leak hot combustion gases or restrict the flow of cooling air between adjacent transition ducts due to the geometry of the transition ducts and turbine inlet, dimensional tolerances and assembly techniques utilized. Therefore, in order to minimize any leakage, a seal arrangement is typically utilized at the region between the transition ducts and the turbine inlet. One type of seal of the prior art is a sheet metal plate that slides between adjacent transition ducts to prevent hot combustion gases from squeezing between adjacent transition ducts.

Figure 2:
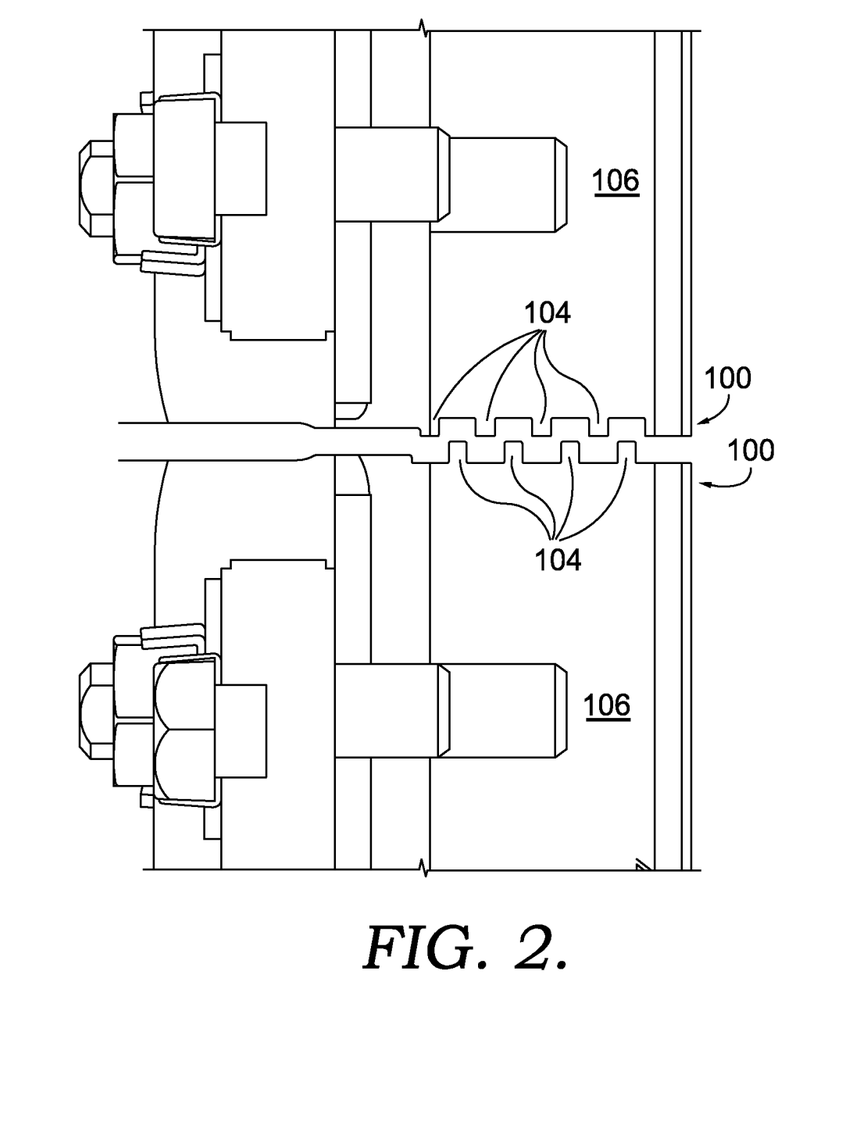
FIG. 2 is a top elevation view of a portion of adjacent transition ducts installed in a gas turbine engine.

Another type of seal common in gas turbine transition ducts is a plurality of interlocking teeth at a side seal location of a transition duct aft frame, such as that disclosed by U.S. Pat. No. 6,619,915, which is hereby incorporated by reference. Such a configuration is depicted in FIG. 2. As the transition ducts increase in operating temperatures, the aft frame region tends to expand radially outward, thereby causing the plurality of teeth to engage with a plurality of teeth of an adjacent transition duct, to thereby form a seal between adjacent transition ducts.

Figure 3:
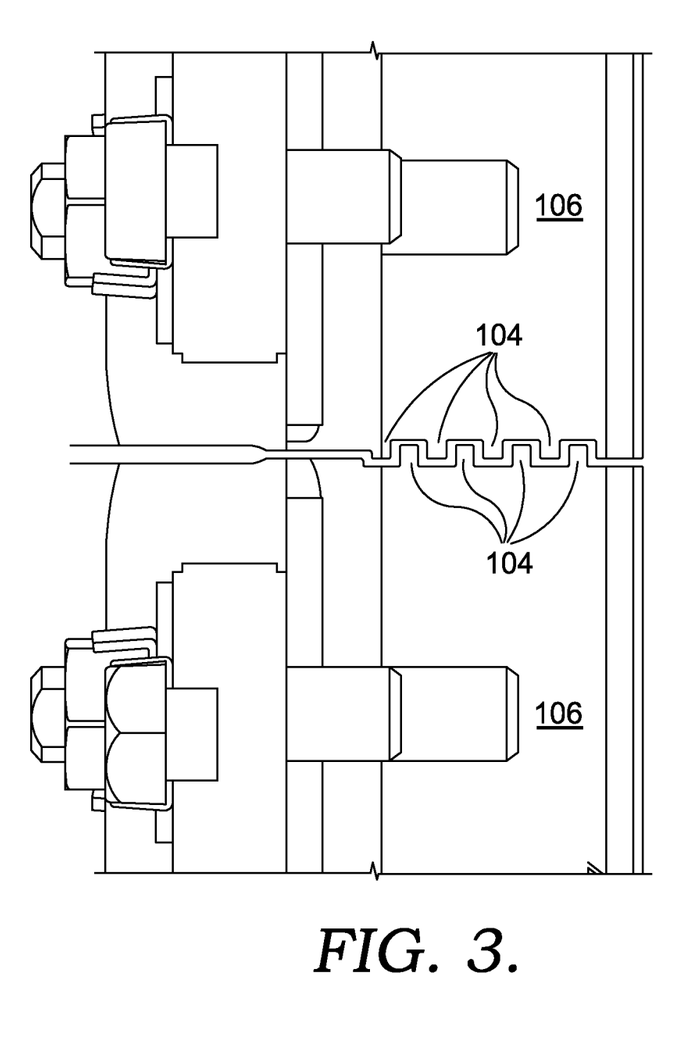
FIG. 3 is a top elevation view of a portion of adjacent transition ducts installed in a gas turbine engine depicting the position of the adjacent transition duct side seal regions when the transition ducts are operating at an elevated temperature.

The engagement of the plurality of teeth from adjacent side seal regions of transition ducts is intended to reduce the amount of hot combustion gases leaking from the transition duct, but not necessarily eliminate it. The plurality of teeth from adjacent transition ducts form a labyrinth seal. That is, the plurality of teeth are designed to close the gaps, when operating at an elevated temperature, and not contact each other, as shown in FIG. 3.

Figure 4:
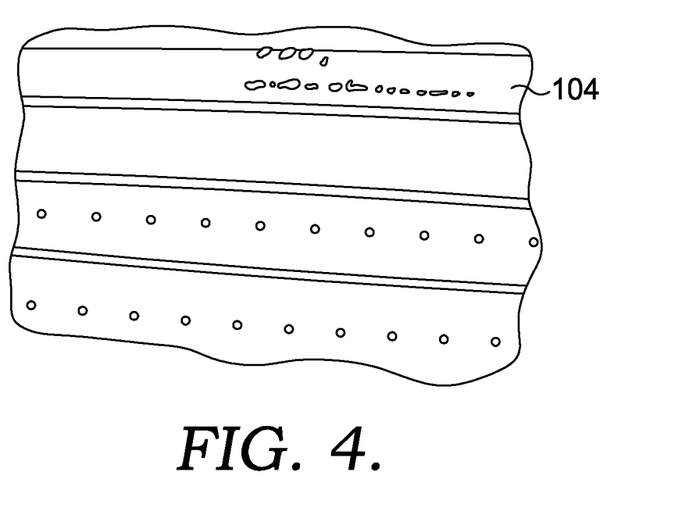
FIG. 4 depicts a portion of the side seal region having one or more seal teeth exhibiting worn conditions.

However, conditions have been known to occur where the side seal regions of adjacent transition ducts do in fact contact each other. This can be due to improper installation of the transition ducts or excessive amounts of thermal growth or movement between adjacent transition ducts. Contact between adjacent side seal regions can result in unwanted wear such as fretting to the seal teeth, which then permits the seal teeth to oxidize due to the lack of cooling air passing between the interlocking teeth. A representative example of the wear to the seal teeth is depicted in FIG. 4.

As a result of this unwanted wear, it is necessary to repair the teeth of the side seal region in order to continue using the transition duct. The most common repair technique for this area of the transition duct is a weld repair, such as a manual TIG weld using a nickel-based weld rod. Such weld repair processes require extensive repair time, special fixturing to reduce distortion from the localized heating during the welding process, profile correction, and re-machining of the seal teeth in order to return the seal teeth to original equipment conditions. Such repair processes are extremely labor intensive, especially for smaller amounts of wear to the seal teeth.

The present invention seeks to overcome the problems of the prior art design by providing an improved repair methodology that reduces repair time and cost.

SUMMARY

The present invention discloses various methods for repairing a side seal region of a transition duct aft frame region. More specifically, in an embodiment of the present invention, a method of repairing a side seal region comprises determining whether one or more seal teeth are out of compliance with a dimensional standard, determining an amount of wear to the one or more seal teeth, applying a braze filler material to the one or more seal teeth and adhering the braze filler material to the one or more seal teeth through a braze cycle. The braze cycle heats the transition duct incrementally to a peak temperature value such that the braze cycle performs the function of bonding the braze filler material to the one or more seal teeth while also simultaneously solutioning the transition duct.

In an alternate embodiment of the present invention, an alternate method of repairing a side seal region of a transition duct aft frame region is disclosed. The alternate method comprises determining whether one or more seal teeth are out of compliance with a dimensional standard, determining an amount of wear to the one or more seal teeth, preparing the one or more seal teeth to be repaired, fabricating one or more braze preforms for the one or more seal teeth to be repaired, temporarily securing the braze preform to the one or more seal teeth, and adhering the braze filler material to the one or more seal teeth through a braze cycle. The braze cycle heats the transition duct incrementally to a peak temperature value such that the braze cycle performs the function of bonding the braze filler material to the one or more seal teeth while also simultaneously solutioning the transition duct.

In yet another embodiment of the present invention, another method of repairing a side seal region of a transition duct aft frame is disclosed. The method comprises the steps of determining one or more seal teeth to be out of compliance with an acceptable dimensional standard, determining an amount of wear to the one or more seal teeth, preparing the side seal region to be repaired, and fabricating a coupon formed of a material similar to that of the transition duct aft frame. The coupon is temporarily secured to the side seal region that is being repaired and a braze paste is applied between the coupon and the side seal region. The coupon is adhered to the to the side seal region through a braze cycle so as to form a replacement tooth in the side seal region. The braze cycle heats the transition duct incrementally to a peak temperature value such that the braze cycle performs the function of bonding the braze filler material to the seal tooth while simultaneously solutioning the transition duct.

Additional advantages and features of the present invention will be set forth in part in a description which follows, and in part will become apparent to those skilled in the art upon examination of the following, or may be learned from practice of the invention. The instant invention will now be described with particular reference to the accompanying drawings.

BRIEF DESCRIPTION OF THE SEVERAL VIEWS OF THE DRAWINGS

The present invention is described in detail below with reference to the attached drawing figures, wherein.

DETAILED DESCRIPTION

Figure 1:
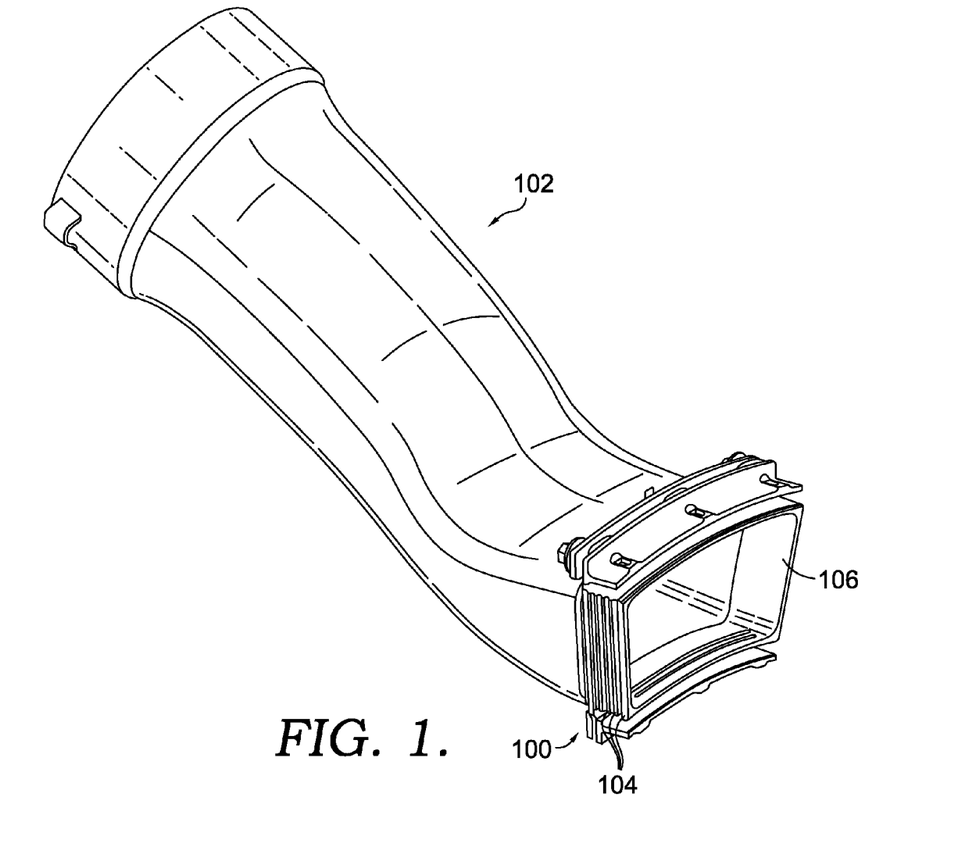
FIG. 1 is a perspective view of a transition duct of a gas turbine engine.

The present invention discloses a plurality of methods for repairing a side seal region of a transition duct aft frame. Referring initially to FIGS. 1-3 and 5, the type of repair method to the side seal region 100 of a transition duct 102 depends on the amount of wear exhibited by one or more seal teeth 104 in the side seal region 100 of the aft frame 106. A representative transition duct being repaired by the process disclosed herein is shown in FIGS. 1-3 and is fabricated from a high-temperature nickel-based alloy, such as Haynes® 230®.

That is, the present invention provides a plurality of repair techniques for one or more seal teeth that have exhibited wear and/or oxidation, as discussed above. Each repair process is able to be completed at a lower cost and involves a shorter repair time than prior repair techniques.

Referring to FIGS. 5A-5E in particular, the repair process 500 is depicted. In a first step 502, a determination is made as to whether one or more seal teeth are out of compliance with an acceptable dimensional standard. That is, the locations of the seal teeth and their respective dimensions at the side seal region are measured and compared to acceptable dimensions as determined by the manufacturer or service provider.

Figure 5A:
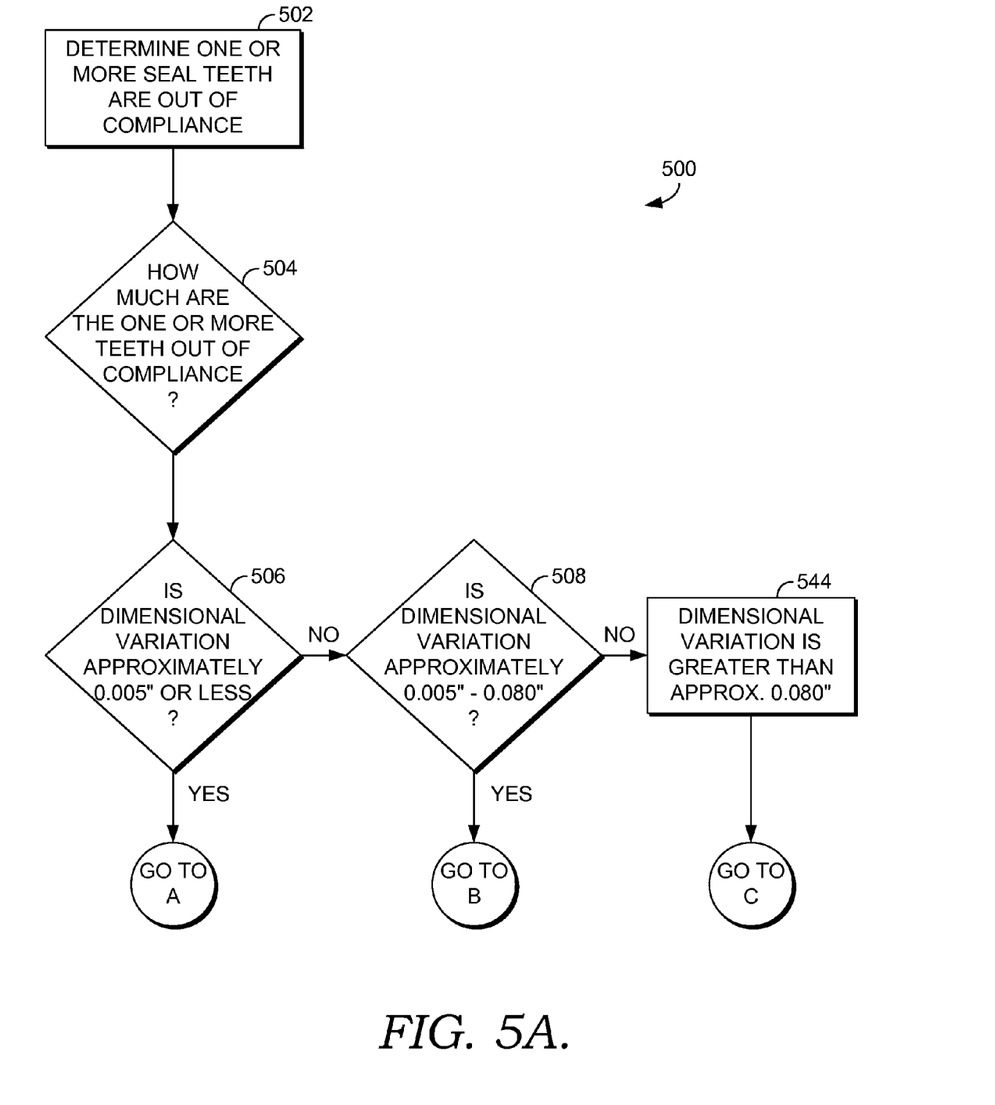
FIGS. 5A-5E depict a flow chart for the repair processes provided by the present invention.

In a step 504, a determination is made as to how much the one or more seal teeth are out of compliance. Then, in a step 506, a determination is made as the whether the dimensional variation is less than 0.005 inches or less. If the amount of wear to the one or more seal teeth is more than 0.005 inches, then in a step 508, a determination is made as to whether the dimensional variation is approximately 0.005 inches to approximately 0.080 inches. These wear dimensions relative to the acceptable standard are subject to a tolerance of +/−0.005 inches.

Figure 5B:
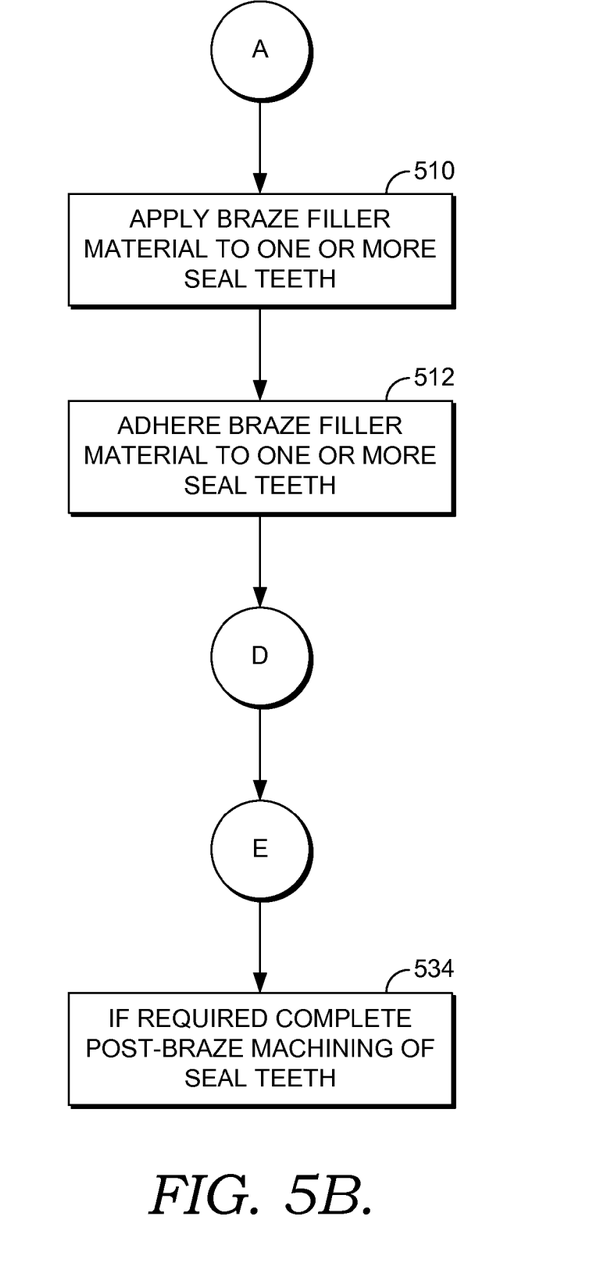

If the amount of dimensional variation is approximately 0.005 inches or less, then the one or more seal teeth requiring repair can be repaired strictly by a braze filler repair. That is, in a step 510, as shown in FIG. 5B, the braze filler material is applied directly to the one or more seal teeth to be repaired. For the embodiment discussed herein, the braze filler material can take on a variety of forms, such as a paste, tape, or foil. For this repair process, the braze filler material is either a nickel-based alloy powder mixed with a nickel-based braze, a cobalt-based alloy powder mixed with a cobalt-based braze, or a hybrid cobalt-based alloy powder with a nickel-based braze. More specifically, for the nickel-based braze filler material, the braze filler material comprises approximately 50% nickel-based alloy powder and approximately 50% nickel-based braze. One such acceptable nickel-based mixture is a Haynes® 230® powder and a DF6A braze paste produced by Sulzer Metco. However, for the cobalt-based braze filler, the braze filler material comprises approximately 60% cobalt-based alloy powder and approximately 40% cobalt-based braze. One such acceptable cobalt-based mixture is MarM509 powder mixed with MarM509B braze paste, each also produced by Sulzer Metco. A nickel-based braze filler provides material capabilities similar to that of the transition duct material, whereas a cobalt-based braze filler provides increased material properties over the transition duct materal. While specific braze filler material compositions are identified above, a person having ordinary skill in the art of brazing technology will understand that variations to the ratio of the alloy powder to braze are possible, such that the ratios identified above could vary.

Figure 5C:
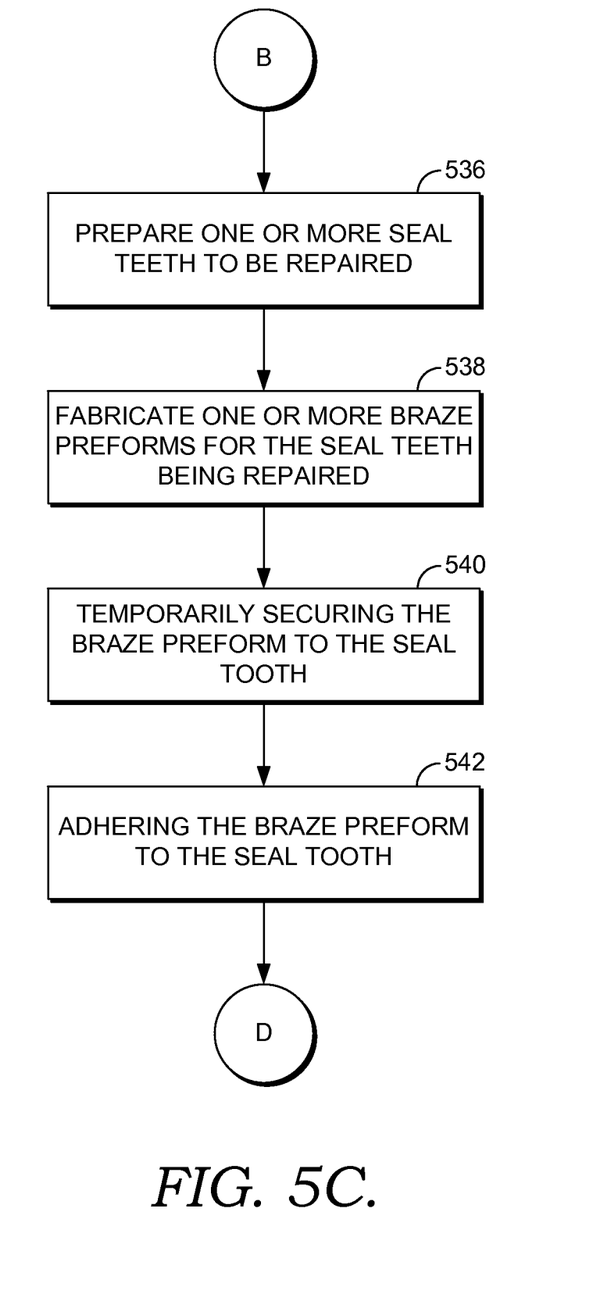
Figure 5D:
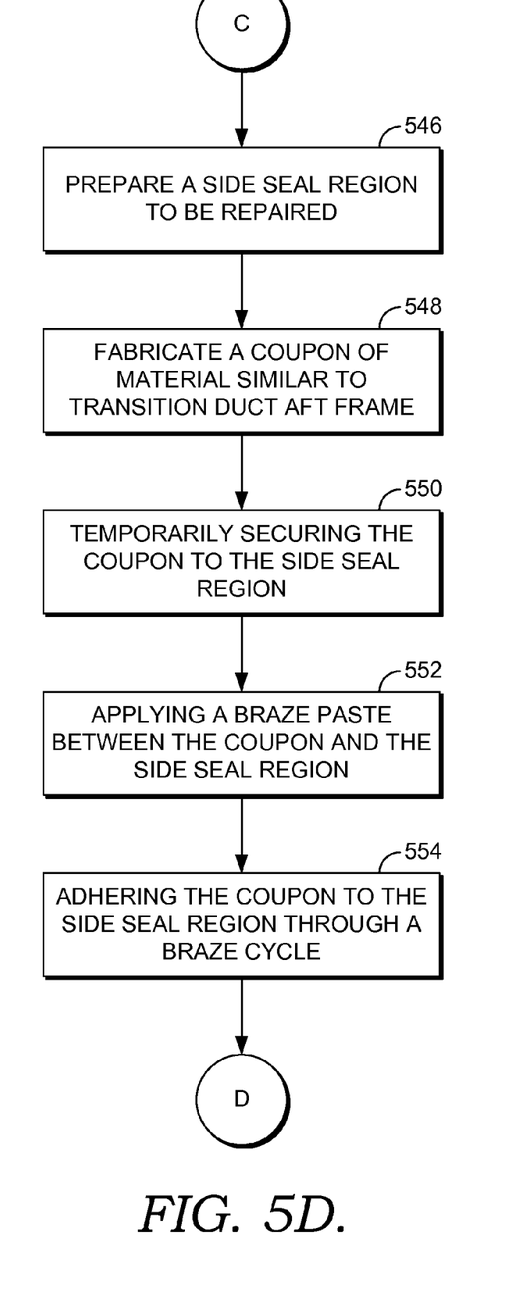
Figure 5E:
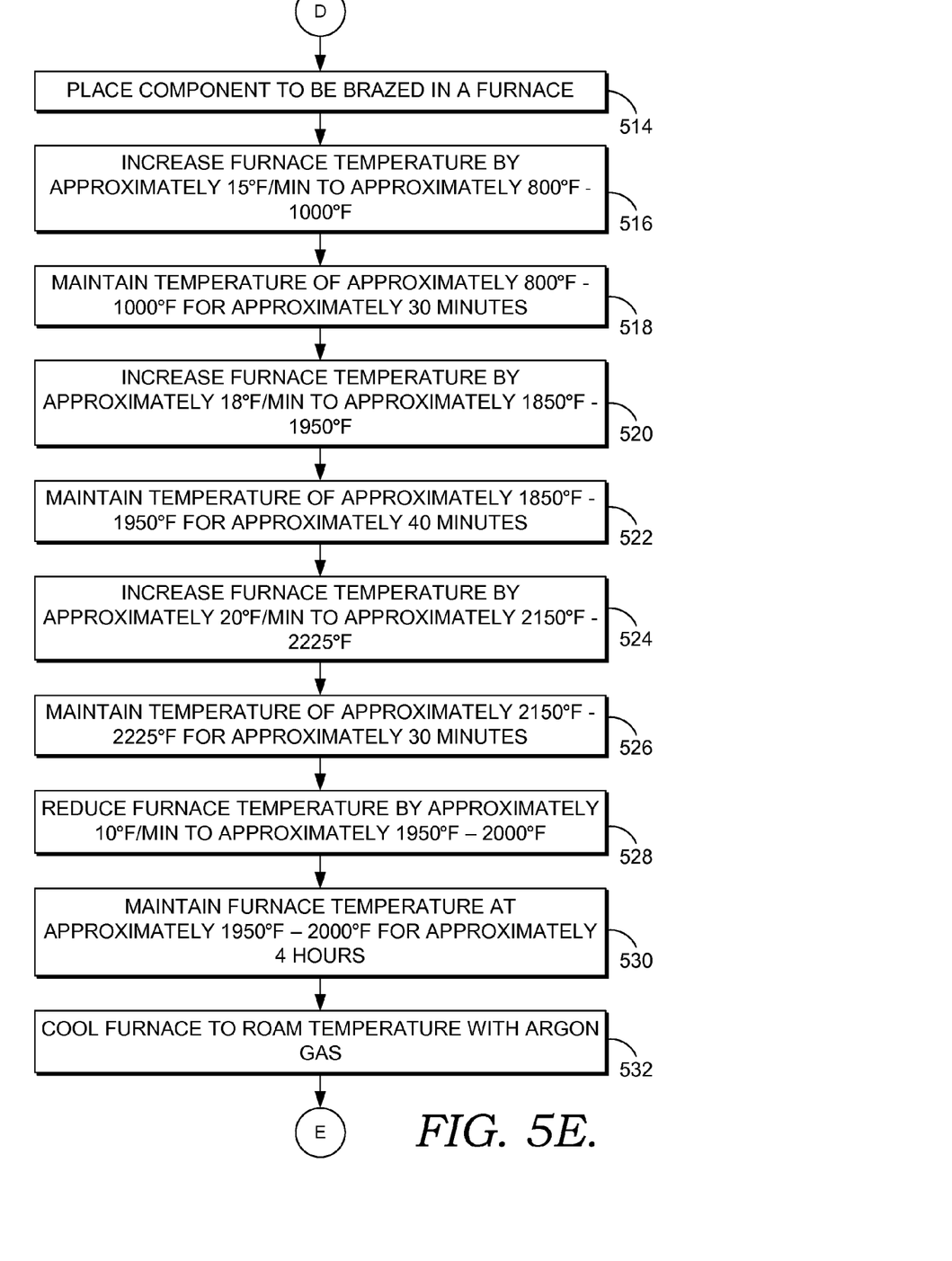

The braze filler material is adhered to the one or more seal teeth through a braze process in a step 512, which is disclosed in further detail in a series of steps 514-532 in FIG. 5E. More specifically, the braze cycle heats the transition duct incrementally to a peak temperature value of approximately 2200 degrees Fahrenheit. The braze cycle employed can be used regardless of the amount of wear being repaired such that the braze cycle bonds the filler material to the one or more seal teeth while simultaneously stress relieving the transition duct, so as to relieve stresses built up within the transition duct during other repair processes, such as welding of the transition duct.

More specifically, the braze cycle is described in FIG. 5E. That is, in a step 514, the transition duct that is be repaired via the braze process is placed in a furnace. In one embodiment, the braze cycle is performed in a vacuum furnace where the level of vacuum pressure ranges from $1.0 \times 10^{-2}$ torr-$1.0 \times 10^{-6}$ torr. Alternatively, the braze cycle can also be performed by backfilling the furnace with hydrogen or argon gas. This process is referred to as a partial pressure brazing process.

Once the transition duct is placed in the furnace, in a step 516, the furnace temperature is increased to approximately 800-1000 degrees Fahrenheit at a rate of approximately 15 degrees per minute. Then, in a step 518, the furnace temperature is maintained at approximately 800-1000 degrees Fahrenheit for approximately 30 minutes. In a step 520, the temperature of the furnace is increased to approximately 1850-1950 degrees Fahrenheit at a rate of approximately 18 degrees per minute. Once the furnace has heated to approximately 1850-1950 degrees Fahrenheit, the furnace temperature is maintained at that temperature for approximately 40 minutes in a step 522.

In a step 524, the temperature of the furnace is increased to approximately 2150-2225 degrees Fahrenheit at a rate of approximately 20 degrees per minute. Once the furnace reaches approximately 2150-2225 degrees Fahrenheit, the furnace is maintained at that temperature for approximately 30 minutes in a step 526. The approximately 2150-2225 degrees Fahrenheit operating temperature is the maximum heating point for the braze repair cycle of the present invention, after which point, the temperature of the furnace is reduced.

In a step 528 the temperature of the furnace is reduced at a rate of approximately 10 degrees per minute to approximately 1950-2000 degrees Fahrenheit. Once the furnace reaches approximately 1950-2000 degrees Fahrenheit, then in a step 530, that temperature is maintained for approximately four hours. Then, in a step 532, the temperature of the furnace is reduced to room temperature at a rapid rate using an argon gas. Upon completion of the brazing process, the transition duct is removed from the furnace.

As discussed above, the brazing process also provides a solutioning to the transition duct, as the temperature cycle and duration provide stress relief to any high stress regions present in the transition duct due to weld repairs or other work performed to other regions of the transition duct. Furthermore, the braze cycle elevates the material of the transition duct to a temperature sufficient enough to rejuvenate the base metal so as to restore a majority of the material capabilities provided by the nickel-based alloy. Thus, the braze cycle of the present invention performs multiple functions through a single cycle.

Upon completion of the braze cycle, and especially where only a braze filler material is added, in a step 534, any post-braze machining of the seal tooth is completed. Such a post-braze machining process can include a grinding process, completed by hand or by a machine.

As discussed above, the present invention also applies to repairs of the side seal region of a transition duct where one or more of the seal teeth exhibit wear of approximately 0.005 inches to approximately 0.080 inches, as discussed in step 508. This embodiment is depicted in FIGS. 5A, 5C, and 5E. For transition ducts having one or more teeth exhibiting approximately 0.005 inches to approximately 0.080 inches, in a step 536, the one or more seal teeth requiring repair are prepared for the repair process. Preparation of the one or more seal teeth requiring repair occurs by removing the damaged portion of the seal tooth (the portion under minimum dimension), so as to form a cleaned and roughened tooth surface. This can be accomplished by a grinding operation to remove the damaged tooth.

Then, in a step 538, a braze preform conforming to the geometry of each of the damaged seal teeth locations is fabricated. The one or more braze preforms have a length and width corresponding to a length and width of the one or more seal teeth. It is important to note that the braze preform could also be prepared prior to this point or in conjunction with any of the previous steps discussed.

In a step 540, the one or more braze preforms fabricated in step 538 are temporarily secured to the one or more seal teeth. The one or more braze preforms are temporarily secured in place to the one or more seal teeth by a tack weld.

Then, in a step 542, the one or more braze preforms are adhered to the one or more seal teeth through a braze cycle. The braze cycle for this braze repair process utilizes the same steps of the braze cycle discussed with respect to steps 514-532. For the embodiment of the present invention discussed herein, the braze filler material from which the preform is fabricated is either a nickel-based alloy powder mixed with a nickel-based braze or a cobalt-based alloy powder mixed with a cobalt-based braze, where the cobalt-based material provides superior wear conditions over the nickel-based material. Depending on the braze process, the braze preform, once adhered to the seal tooth, may require some post-braze machining in order to ensure the repaired seal tooth has the proper dimensions. Any post-braze machining, should it be necessary, can be completed by hand or machine.

Another embodiment of the present invention is depicted in FIGS. 5A, 5D, and 5E and occurs when there is a level of damage to the one or more seal teeth so significant that the one or more seal teeth must be replaced. Under these circumstances, the braze repair with either braze filler or a braze preform applied to the seal tooth, as discussed above, is not a practical fix. This type of repair occurs when the one or more seal teeth exhibit wear of approximately 0.080 inches or more, as indicated by step 544. Where such wear to the one or more seal teeth is approximately 0.080 inches or greater, then in a step 546, the side seal region of the transition duct to be repaired is prepared by removing one or more seal teeth altogether from the side seal region. Once the surface has been prepared, a coupon of material similar to that of the transition duct aft frame is fabricated in a step 548. It is important to note that the coupon could be fabricated earlier in the repair process, once the extent of the seal tooth repair is known. The coupon is sized so as to have a length and width that is compatible to a seal tooth that is being replaced.

In a step 550, the coupon is temporarily secured to the side seal region that is being repaired. The coupon is temporarily secured to the side seal region by a tack weld, including a resistance, tungsten inert gas tack weld, or a laser weld. Then, in a step 552, a braze filler material is applied between the coupon and the side seal region. The braze filler material used in step 552 is formed from a nickel-based alloy braze material or a cobalt-based alloy braze material, and can take the form of a paste, tape or foil.

The coupon is adhered to the side seal region through a braze cycle in a step 554. As discussed above, the braze cycle utilized for the other embodiments discussed herein in steps 514-532 can also be used for brazing the coupon of material on to the side seal region in step 554.

While the invention has been described in what is known as presently the preferred embodiment, it is to be understood that the invention is not to be limited to the disclosed embodiment but, on the contrary, is intended to cover various modifications and equivalent arrangements within the scope of the following claims. The present invention has been described in relation to particular embodiments, which are intended in all respects to be illustrative rather than restrictive.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

The invention claimed is:

1. A method of repairing side seal regions of transition duct aft frames of a gas turbine, the method comprising:
providing a pair of side seal regions coupled to adjacent transition duct aft frames, each of the pair of side seal regions having a plurality of seal teeth, the pair of side seal regions positioned such that the plurality of seal teeth of each side seal region of the pair of side seal regions form an interlocking labyrinth seal that permits fluid communication between the pair of side seal regions;
determining one or more seal teeth of the pair of side seal regions are out of compliance with an acceptable dimensional standard due to undesired contact between the pair of side seal regions during operation of the gas turbine, such that the fluid communication through the interlocking labyrinth seal is increased;
determining an amount of wear to the one or more seal teeth;
applying a braze filler material to the one or more seal teeth; and
adhering the braze filler material to the one or more seal teeth through a braze cycle to at least partially restore the acceptable dimensional standard of the one or more seal teeth,
wherein the braze cycle heats the transition duct aft frames incrementally to a peak temperature value where the braze cycle bonds the braze filler material to the one or more seal teeth while simultaneously solutioning the transition duct.

2. The method of claim 1, wherein the one or more seal teeth are approximately 0.005 inches or less under the acceptable dimensional standard.

3. The method of claim 1, wherein dimensions compared to the acceptable dimensional standard are subject to a tolerance of +/−0.005 inches.

4. The method of claim 1, wherein the braze filler material is a nickel-based alloy powder mixed with a nickel-based braze.

5. The method of claim 4, wherein the braze filler material comprises approximately 50% nickel-based alloy powder and approximately 50% nickel-based braze.

6. The method of claim 1, wherein the braze filler material is a cobalt-based alloy powder mixed with a cobalt-based braze.

7. The method of claim 6, wherein the braze filler material comprises approximately 60% cobalt-based alloy powder and approximately 40% cobalt-based braze.

8. The method of claim 1, wherein the braze filler material is a cobalt-based alloy powder mixed with a nickel-based braze.

9. The method of claim 1, wherein the peak temperature value is approximately 2200 degrees Fahrenheit.

10. The method of claim 1, wherein the transition duct is fabricated from Haynes 230 or Haynes 282.

11. The method of claim 1, further comprising determining whether a post-braze machining is necessary for at least one of the pair of side seal regions.

12. The method of claim 11, wherein the post-braze machining comprises a hand operated grinding process.

13. A method of repairing side seal regions of transition duct aft frames, the method comprising:
providing a pair of side seal regions coupled to adjacent transition duct aft frames, each of the pair of side seal regions having a plurality of seal teeth, the pair of side seal regions positioned such that the plurality of seal teeth of each side seal region of the pair of side seal regions form an interlocking labyrinth seal that permits fluid communication between the pair of side seal regions;
determining one or more seal teeth of the pair of side seal regions are out of compliance with an acceptable dimensional standard due to undesired contact between the pair of side seal regions during operation of the gas turbine, such that the fluid communication through the interlocking labyrinth seal is increased;
determining an amount of wear to the one or more seal teeth;
preparing the one or more seal teeth to be repaired;
fabricating one or more braze preforms for the one or more seal teeth;
temporarily securing the braze preform to the one or more seal teeth; and
adhering the braze preform to the one or more seal teeth through a braze cycle to at least partially restore the acceptable dimensional standard of the one or more seal teeth,
wherein the braze cycle heats the transition duct aft frames incrementally to a peak temperature value where the braze cycle bonds the braze preform to the one or more seal teeth while simultaneously solutioning the transition duct.

14. The method of claim 13, wherein the one or more seal teeth have a wear amount of approximately 0.005 inches-approximately 0.080 inches.

15. The method of claim 13, wherein dimensions compared to the acceptable dimensional standard are subject to a tolerance of +/−0.005 inches.

16. The method of claim 13, wherein the braze preform is a nickel-based alloy powder mixed with a nickel-based braze.

17. The method of claim 13, wherein the braze preform is a cobalt-based alloy powder mixed with a cobalt-based braze.

18. The method of claim 13, wherein the step of preparing the one or more seal teeth to be repaired comprises removing material of the one or more seal teeth so as to form a cleaned and roughened tooth surface.

19. The method of claim 13, wherein the one or more braze preforms have a length and width corresponding to a length and width of the one or more seal teeth.

20. The method of claim 13, wherein the one or more braze preforms are temporarily secured in place by a tack weld.

21. The method of claim 13, wherein the peak temperature value is approximately 2200 degrees Fahrenheit.

22. A method of repairing side seal regions of transition duct aft frames, the method comprising:
providing a pair of side seal regions coupled to adjacent transition duct aft frames, each of the pair of side seal regions having a plurality of seal teeth, the pair of side seal regions positioned such that the plurality of seal teeth of each side seal region of the pair of side seal regions form an interlocking labyrinth seal that permits fluid communication between the pair of side seal regions;
determining one or more seal teeth of the pair of side seal regions are out of compliance with an acceptable dimensional standard due to undesired contact between the pair of side seal regions during operation of the gas turbine, such that the fluid communication through the interlocking labyrinth seal is increased;

determining an amount of wear to the one or more seal teeth;

preparing at least one of the pair of side seal regions to be repaired;

fabricating a coupon formed of a material similar to that of the transition duct aft frames;

temporarily securing the coupon to the at least one of the pair of side seal regions being repaired;

applying a braze filler material between the coupon and the at least one of the pair of side seal regions being repaired; and adhering the coupon to the at least one of the pair of side seal regions being repaired through a braze cycle so as to form a replacement tooth in the at least one of the pair side seal regions being repaired, to at least partially restore the acceptable dimensional standard of the one or more seal teeth, wherein the braze cycle heats the at least one of the pair of side seal regions being repaired incrementally to a peak temperature value where the braze cycle bonds the coupon to the one or more seal teeth while simultaneously stress relieving the respective transition ducts of the at least one of the pair of side seal regions being repaired.

23. The method of claim 22, wherein the one or more seal teeth has a wear amount of approximately 0.080 inches or greater.

24. The method of claim 22, wherein the step of preparing the side seal region to be repaired comprises removing the one or more seal teeth from the side seal region.

25. The method of claim 22, wherein the coupon is sized so as to have a length and width comparable to the plurality of seal teeth.

26. The method of claim 22, wherein the coupon is temporarily secured to the at least one of the pair of side seal regions by tack welds.

27. The method of claim 22, wherein the coupon is adhered to the at least one of the pair of side seal regions with a braze paste formed from a nickel or cobalt-based alloy braze material.

28. The method of claim 22, wherein the peak temperature value is approximately 2200 degrees Fahrenheit.

* * * * *